United States Patent Office 3,635,941
Patented Jan. 18, 1972

3,635,941
DISPERSE MONO AZO DYES CONTAINING AN ACYLAMIDOTETRAHYDROQUINOLINE GROUP
Max A. Weaver, James M. Straley, and Clarence A. Coates, Jr., Kingsport, Tenn., assignors to Eastman Kodak Company, Rochester, N.Y.
No Drawing. Filed Apr. 1, 1969, Ser. No. 812,411
Int. Cl. C09d 29/36
U.S. Cl. 260—155                                                10 Claims

ABSTRACT OF THE DISCLOSURE

Water-insoluble azo compounds having a 1-alkyl- or 1-cycloalkyl-7-acylamido-1,2,3,4-tetrahydroquinoline coupling component and certain substituted phenyl groups as a diazo component are useful as dyes for polyester textile materials.

---

This invention relates to certain novel, water-insoluble azo compounds and, more particularly, to azo compounds containing an acylamidotetrahydroquinoline group and to polyester textile materials dyed therewith.

The novel compounds of the invention have the Formula I

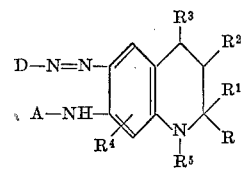

wherein D is a phenyl radical having the structure

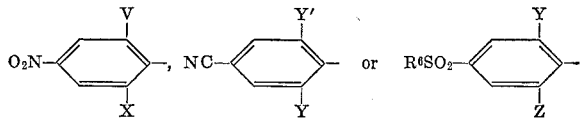

wherein

V is halogen, cyano, lower alkanoyl, aroyl, lower alkylsulfonyl, or trifluoromethyl;
X is nitro or cyano;
Y and Y' are the same or different and each is hydrogen, cyano, or halogen;
Z is hydrogen, cyano, halogen, or lower alkylsulfonyl; and
$R^6$ is lower alkyl;
A is an acyl radical;
R, $R^1$ and $R^3$ are the same or different and each is hydrogen or lower alkyl;
$R^2$ is hydrogen, lower alkoxy or lower alkanoyloxy;
$R^4$ is hydrogen, lower alkyl or lower alkoxy; and
$R^5$ is an alkyl radical, free of hydroxy and vinylsulfonyl groups, or a cycloalkyl radical.

The azo componds of the invention produce red to turquoise shades on polyester textile materials when applied thereto according to conventional dyeing procedures. The novel azo compounds possess excellent brightness, dyeability and fastness properties. For example, the compounds possess excellent affinity for and build-up on polyester fibers. The compounds of the invention also exhibit excellent fastness to light and resistance to sublimation when tested according to the procedures described in the Technical Manual of the American Association of Textile Chemists and Colorists. For example, the novel azo compounds in general exhibit superior fastness properties, such as fastness to light, and superior brightness on polyester fibers when compared with the azo compounds disclosed in U.S. Pat. 2,249,774. In describing the compounds of the invention as water-insoluble it is meant that the compounds are relatively and substantially water-insoluble due to the absence of water-solubilizing groups such as sulfo and salts thereof.

Chlorine and bromine are typical halogen atoms which V, Y and Z can represent. Examples of the alkanoyl, aroyl and alkylsulfonyl groups which V, Y and/or Z can represent and the alkylsulfonyl groups represented by $R^6SO_2$— are set forth in the following definition of A. Examples of the alkyl groups represented by $R^6$ appear in the definition of $R^5$ hereinbelow.

The acyl groups represented by A can be formyl, lower alkanoyl, aroyl, cyclohexylcarbonyl, lower alkoxycarbonyl, aryloxycarbonyl, lower alkylsulfonyl, cyclohexylsulfonyl, arylsulfonyl, carbamoyl, lower alkylcarbamoyl, arylcarbamoyl, sulfamoyl, lower alkylsulfamoyl, furoyl, etc. The alkanoyl groups can be substituted with substituents such as halogen, aryl, cyano, lower alkoxy, benzyloxy, lower alkylthio, lower alkylsulfonyl, etc. The alkylsulfonyl groups also can be substituted, for example, with cyano, hydroxy, halogen and the like. The alkoxycarbonyl groups can be substituted, for example, with hydroxy, alkoxy and cyano. Acetyl, propionyl, butyryl, cyanoacetyl, chloroacetyl, trifluoroacetyl, phenylacetyl, methoxyacetyl, methylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-hydroxyethylsulfonyl, and 2-chloroethylsulfonyl, are examples of the alkanoyl, alkoxycarbonyl, and alkylsulfonyl groups which A can represent. The aryl group, designated Ar, of the arylalkanoyl, aroyl, aryloxycarbonyl, arylsulfonyl, and arylcarbamoyl groups preferably is monocyclic, carbocyclic aryl such as unsubstituted phenyl and phenyl substituted with, for example, lower alkyl, lower alkoxy, halogen, etc. Tolyl, anisyl, p-bromophenyl and o,p-dichlorophenyl are typical of such aryl groups. Dimethylcarbamoyl, ethylcarbamoyl, propylcarbamoyl, butylcarbamoyl, and dimethylsulfamoyl are illustrative alkylcarbamoyl and alkylsulfamoyl groups which A can represent.

Methyl, ethyl, propyl, isopropyl, isobutyl, butyl, etc. are typical alkyl groups which R, $R^1$, $R^3$ and $R^4$ can represent. Methoxy, ethoxy, propoxy and butoxy are representative of the alkoxy groups which $R^2$ and $R^4$ can represent. Examples of the alkanoyloxy groups which $R^2$ can represent include acetoxy, propionoxy, butyroxy, isobutyroxy, etc. As used herein to describe a group containing an alkyl moiety, "lower" designates a carbon content of up to about 4 carbon atoms. Preferably, R is methyl or, when $R^1$ and $R^3$ each is hydrogen, lower alkyl, and each of R, $R^1$ and $R^3$ is hydrogen when $R^2$ is lower alkoxy or lower alkanoyloxy.

The alkyl radicals which $R_5$ can represent can be straight- or branch-chain, substituted or unsubstituted alkyl of up to about 10 carbon atoms. The unsubstituted alkyl radicals preferably contain from 1 to about 6 carbon atoms while the substituted alkyl groups preferably contain 3 to about 8 carbon atoms. Methyl, ethyl, propyl, isoproply, butyl, isobutyl, amyl and hexyl are typical of the unsubstituted alkyl groups which $R^5$ can represent. The alkyl radicals represented by $R^5$ can be substituted with a wide variety of 1, 2 or more substituents. For example substituents conforming to the formulas

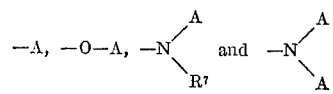

wherein A is defined hereinabove and $R^7$ is hydrogen, lower alkyl, lower cyanoalkyl, lower hydroxyalkyl, lower alkoxyalkyl, lower alkanoyloxyalkyl, cyclohexyl, lower alkylcyclohexyl, benzyl, 2-phenylethyl, phenyl, lower alkylphenyl, etc., can be present on the alkyl radical R⁵. The dicarboximido, pyrrolidinono, piperidino, and phthalimidino radicals disclosed in U.S. Pats. 3,148,178 and 3,342,799, the substituted dicarboximido groups disclosed in U.S. Pat. 3,386,987 and the groups having the formula

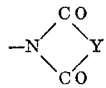

which are disclosed in U.S. Pat. 3,349,076 also can be present on alkyl radical R5. Other substituents which can be present on alkyl radical $R^5$ include cyano, lower alkoxy, lower cyanoalkoxy, lower alkylthio, lower cyanoalkylthio, arylthio, cyclohexylthio, halogen, aryloxy, thiocyano, sulfamoyl, lower alkylsulfamoyl, and groups having the structure

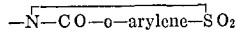

The aryl and arylene moieties of the substituents referred to in the preceding sentence can be unsubstituted phenyl or phenyl substituted, for example, with lower alkyl, lower alkoxy, or halogen. Azolethio groups such as 2-benzothiazolylthio, 1,2,4-triazol-3-ylthio, and 2-benzothiazolylthio groups are other substituents which can be present on alkyl radical R⁵. The alkyl radicals represented by R⁵ can be substituted with an unsubstituted or substituted phenyl group. Lower alkylphenyl, lower alkoxyphenyl, halophenyl, lower alkoxycarbonylphenyl, etc. are typical of the substituted phenyl groups. Examples of phenylalkyl radicals represented by R⁵ include benzyl, 2-phenylethyl, 2-p-ethylphenylethyl, p-methoxycarbonylbenzyl, m-chlorobenzyl, 2-p-methoxyphenylethyl, etc. The cycloalkyl radicals which R⁵ can represent preferably are cyclopentyl, cyclohexyl and lower alkyl-substituted derivatives thereof.

The following groups are typical of the substituted alkyl, cyclohexyl and aralkyl radicals represented by R⁵: 3-acetoxyethyl, 2,3-dipropionoxypropyl, 2-phenylcarbamoyloxyethyl, 2 - ethoxycarbonyloxyethyl, 4 - toluoyloxy, acetyl, 2-methylsulfonylethyl, 3-(2-cyanoethylsulfonyl)-propyl, 3-methylsulfonylamidopropyl, 3-N-acetylmethylsulfonamidopropyl, 3-N-phenylmethylsulfonamidopropyl, 2-N-(2-cyanoethyl)-p-tolylsulfonamidoethyl, 3-succinimidopropyl, 2-glutarimidoethyl, 2-phthalimidoethyl, 4-(2-piperidiono)butyl, 2-cyanoethyl,2-methoxyethyl, 3-sulfamoyl-propyl, 2-(1H-1,2,4-triazol - 3 - yl - thio)ethyl, 3-(4-acetoxysuccinimido)propyl, 3-tolylthiopropyl, 2-phenoxyethyl, 2-dimethylsulfamoylethyl, cyclohexyl, 4-ethylcyclohexyl, 2 - acetoxy - 3 - chloropropyl, 3,3,5-trimethylcyclohexyl, benzyl, 2-phenylethyl, p-methylbenzyl, m-methoxycarbonylbenzyl, 3-cyclohexoxypropyl, 3-(2-cyanoethoxy)-propyl, 3-isobutyramidopropyl, and 3-N-benzylethylsulfonamidopropyl.

Preferred compounds of the invention are those conforming to Formula I wherein

D represents a group having the formula

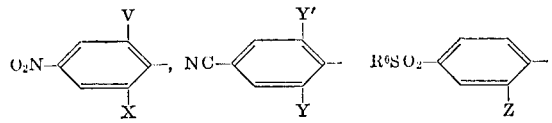

wherein

V is chlorine, bromine, cyano, or benzoyl;
X is nitro or cyano;
Y and Y′ each is hydrogen, cyano, chlorine or bromine;
Z is hydrogen, chlorine, bromine, or lower alkylsulfonyl;
$R^6$ is lower alkyl;
A is lower alkanoyl, benzoyl, lower alkoxycarbonyl, lower alkylsulfonyl or lower alkylcarbamoyl;
R is methyl or, when $R^1$ and $R^3$ each is hydrogen, lower alkyl;
$R^1$ and $R^3$ each is hydrogen or methyl;
$R^2$ and $R^4$ each is hydrogen; and R⁵ is lower alkyl, benzyl, 2-phenylethyl, cyclohexyl, or a substituted alkyl group having the formula —R⁸—R⁹ wherein R⁸ is ethylene or propylene and R⁹ is lower alkanoyloxy, lower alkoxy, lower alkanoylamino, cyano, carbamoyl, lower alkylsulfonyl, lower alkoxycarbonyloxy, succinimido, glutarimido, or phthalimido.

The azo compounds of Formula II possess exceptional dyeability and exhibit particularly good brightness and fastness properties when applied to polyester textile materials. These compounds conform to the formula (II) 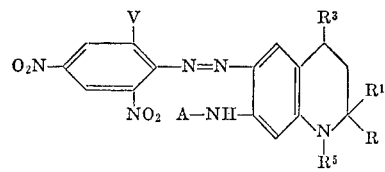

wherein

V is chlorine, bromine or cyano;
A is lower alkanoyl, benzoyl, lower alkoxycarbonyl, lower alkylcarbamoyl;
R is methyl, or when $R^1$ and $R^3$ each is hydrogen, lower alkyl;
$R^1$ and $R^3$ each is hydrogen or methyl; and
R⁵ is lower alkyl, benzyl, or a substituted alkyl group having the formula —R⁸—R⁹ wherein R⁸ is ethylene or propylene, and R⁹ is lower alkoxy, lower alkanoloxy, cyano, carbamoyl, lower alkanoylamino, or lower alkylsulfonyl.

The novel azo compounds are prepared by diazotizing an amine having the formula D—NH₂ and coupling the diazotized amine with a compound having the formula (III) 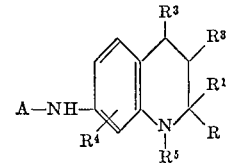

according to known procedures. The compounds of Formula III are obtained by methods analogous to published procedures employing known reactants. For example, a 1,2,3,4-tetrahydroquinoline can be nitrated by treatment with nitric acid in the presence of sulfuric acid. The 7-nitro compound can then be reduced to the 7-amino compound which is then acylated according to known procedures. The ring nitrogen atom of the tetrahydroquinoline can be alkylated before or after nitration, reduction and acylation, using alkylating agents such as acrylonitrile, ethyl bromide, benzyl chloride, isobutyl bromide, methyl vinylsulfone, methylacrylate, triethyl phosphate, p-methoxybenzyl chloride, etc. Such tetrahydroquinoline compounds can also be alkylated by reacting a tetrahydroquinoline with an epoxide resulting in an N-hydroxyalkyltetrahydroquinoline which can be treated further with other compounds such as halogenating and acylating agents. Suitable epoxides include ethylene oxide, epichlorohydrin, 1,2-epoxy - 3 - methoxypropane, 1,2-epoxy-3-phenoxypropane, propylene oxide, etc. The novel azo compounds having a cyano group ortho to the azo group also can be prepared by reacting the analogous o-halo compound with cuprous cyanide in a variety of solvents according to known techniques.

The following examples describe typical procedures by which the couplers of Formula III can be prepared.

EXAMPLE A 1-ethyl - 2,2,4 - trimethyl - 1,2,3,4 - tetrahydroquinoline (96.5 g.) is added slowly to 500 ml. of concentrated H₂SO₄ at about 5° C. Then a solution of 33 ml. concentrated HNO₃ and 33 ml. concentrated H₂SO₄ is added dropwise at 0–5° C. The reaction is stirred 0.5 hr. longer after the addition is completed and then drowned in icewater mixture. After the mixture is made basic with concentrated ammonium hydroxide, the product is taken up in hexane and toluene and washed with water. The solvent is evaporated to leave the 7-nitro compound as a semi-solid mass. The nitro compound (105 g.) is dissolved in 1250 ml. of 2B alcohol and hydrogenated in the presence of Raney nickel at 75° C. and about 1500 p.s.i. hydrogen pressure. The catalyst is filtered off and the filtrate evaporated to yield 7-amino-1-ethyl-2,2,4-trimethyl-1,2,3,4-tetrahydroquinoline in the form of a black viscous oil. The 7-amino compound (21.8 g.) is dissolved in 30 ml. of acetic acid. Acetic anhydride (10 ml.) is added, and the reaction is allowed to stand for 1 hr. and then drowned in water. The product, 7-acetamido-1-ethyl-2,2,3-trimethyl-1,2,3,4-tetrahydroquinoline, solidifies on standing, is collected by filtration and recrystallized from water-methanol solution. M.P.: 123–127° C.

Analysis.—Theory for $C_{16}H_{24}N_2O$ (percent): C, 73.8; H, 9.3; N, 10.8. Found (percent): C, 73.5; H, 9.0; N, 10.8.

EXAMPLE B 7-amino-1-ethyl - 2,2,4 - trimethyl - 1,2,3,4 - tetrahydroquinoline is benzoylated using benzoyl chloride in pyridine to yield 7-benzamido-1-ethyl-2,2,4-trimethyl-1,2,3,4-tetrahydroquinoline which melts at 179–182° C.

EXAMPLE C 7-amino-1-ethyl - 2,2,4 - trimethyl - 1,2,3,4 - tetrahydroquinoline is reacted with phenyl isocyanate in benzene to yield 1-ethyl-7-phenylcarbamoylamino - 2,2,4-trimethyl-1,2,3,4-tetrahydroquinoline having a melting point of 165–175° C.

Analysis.—Theory for $C_{21}H_{27}N_3O$ (percent): C, 74.8; H, 8.1; N, 12.5. Found (percent): C, 75.2; H, 8.1; N, 12.6.

EXAMPLE D

7 - nitro - 1,2,3,4 - tetrahydroquinoline (2.7 g.), benzyl chloride (2.2 g.), and N,N-dimethylformamide (25 ml.) are heated and stirred at 140–145° C. for 5 hrs. The reaction is drowned in water and basified by the addition of NH$_4$OH. The product is taken up in benzene-hexane and washed with water. The solvent is evaporated to yield the product, N-benzyl-7-nitro-1,2,3,4-tetrahydroquinoline. The nitro compound is reduced to the amine by hydrogenating in the presence of Raney nickel catalyst as in Example A above.

7-amino-N-benzyl-1,2,3,4-tetrahydroquinoline (2.9 g.) is mixed with 2 ml. of acetic acid, plus 2 ml. of acetic anhydride and heated 0.5 hr. in steam bath. On cooling, the product, 7-acetamido-1-benzyl-1,2,3,4-tetrahydroquinoline, solidifies and is filtered and recrystallized from methanol. It melts at 145–147° C.

The substitution of other acylating and alkylating agents in the procedures described in the preceding example yields various other couplers of Formula III.

Examples of other acylating agents which can be used are as follows: methanesulfonyl chloride, p-toluene sulfonyl chloride, propionic anhydride, butyric anhydride, isobutyric anhydride, chloroacetyl chloride, methoxyacetyl chloride, phenoxyacetyl chloride, cyclohexanecarbonyl chloride, methylthioacetyl chloride, methylsulfonylacetyl chloride, p-methoxybenzoyl chloride, ethyl isocyanate, n-butyl isocyanate, chloroethyl isocyanate, cyclohexyl isocyanate, ethyl chloroformate, methyl chloroformate, n-butyl chloroformate, and cyclohexyl chloroformate.

The prepaartion of the novel azo compounds is further illustrated by the following examples.

EXAMPLE 1

2-cyano-4,6-dinitroaniline (2.08 g.) is slurred in 35 ml. of 70% $H_2SO_4$ at 15° C. The mixture is cooled to —2° C. and a solution of 0.72 g. sodium nitrite in 5 ml. of conc. $H_2SO_4$ is added at —2 to 0° C. The reaction mixture is stirred at 0° C. for 2 hr. and is then added to a solution of 2.60 g. 7-acetamido-1-ethyl-2,2,4-trimethyl-1,2,3,4-tetrahydroquinoline dissolved in 100 ml. of conc. $H_2SO_4$ at below 10° C. After coupling for 1 hr., the dye is precipitated by drowning in water. The product is collected by filtration, washed with water, and air dried. The product, 6-(2-cyano-4,6-dinitrophenylazo) - 7 - acetamido-1-ethyl-2,2,4-trimethyl-1,2,3,4-tetrahydroquinoline, produces a bright greenish-blue shade on polyester fibers and has excellent light-fastness and resistance to sublimation.

EXAMPLE 2

The procedure described in Example 1 is repeated except that 3.22 g. 7-benzamido-1-ethyl-2,2,4-trimethyl-1,2,3,4-tetrahydroquinoline is substituted for the coupler employed in Example 1. The product obtained, 6-(2-cyano-4,6-dinitrophenylazo) - 7 - benzamido - 1 - ethyl-2,2,4-trimethyl-1,2,3,4-tetrahydroquinoline, produces a bright blue shade on polyester fibers.

EXAMPLE 3

The compound 6 - (2-cyano-4,6-dinitrophenylazo) - 7-acetamido-1-benzyl - 2 - methyl - 1,2,3,4 - tetrahydroquinoline, prepared by diazotizing 2.08 g. 2-cyano-4,6-dinitroaniline and coupling with 2.80 g. 7-acetamido-1-benzyl-2-methyl-1,2,3,4-tetrahydroquinoline according to Example 1, produces bright blue shades on polyester fibers.

EXAMPLE 4

2-cyano-4,6-dinitroaniline (2.08 g.) is diazotized and coupled with 7-acetamido-1-(2-succinimidoethyl)-2,2,4-trimethyl-1,2,3,4-tetrahydroquinoline (3.57 g.) according to the procedure employed in Example 1. The dye obtained, 6-(2-cyano-4,6-dinitrophenylazo)-7-acetamido - 1 - (2-succinimidoethyl) - 2,2,4 - trimethyl-1,2,3,4-tetrahydroquinoline, dyes polyester fiber bright blue and has outstanding sublimation fastness.

EXAMPLE 5

To 5 ml. of conc. $H_2SO_4$ is added 0.72 g. dry NaNO$_2$ portionwise. The solution is cooled and 10 ml. of 1:5 acid (1 part propionic: 5 parts acetic acid) is added below 15° C. The mixture is cooled again and 2-bromo-4,6-dinitroaniline (2.62 g.) is added, followed by 10 ml. additional 1:5 acid, all at 0–5° C. After stirring at 0–5° C. for 1 hr. the diazonium solution is added to a solution of 2.60 g. 7-acetamido-1-ethyl - 2,2,4-trimethyl - 1,2,3,4 - tetrahydroquinoline in 100 ml. of conc. $H_2SO_4$, below 10° C. After allowing to stand for 1 hr. at below 10° C., the coupling mixture is drowned into water. The blue product is collected by filtration, washed with water, and dried in air. The azo compound obtained, 4-(2-bromo-4,6-dinitrophenylazo) - 7 - acetamido - 1 - ethyl-2,2,4-trimethyl-1,2,3,4-tetrahydroquinoline, produces bright blue shades on polyester fibers. The analogous 2-chloro dye obtained from 2-chloro-4,6-dinitroaniline also imparts fast blue shades to polyester fibers.

EXAMPLE 6

2-chloro-4,6-dinitroaniline (2.17 g.) is diazotized and coupled with 3.22 g. of 7-benzamido-1-ethyl-2,2,4-trimethyl-1,2,3,4-tetrahydroquinoline according to the procedure described in Example 5. The product, 6-(2-chloro-4,6-dinitrophenylazo) - 7 - benzamido - 1 - ethyl - 2,2,4-trimethyl-1,2,3,4-tetrahydroquinoline produces blue shades of excellent fastness to light and sublimation on polyester fibers.

EXAMPLE 7

Sodium nitrite (0.72 g.) is added portionwise to 5 ml. of concentrated sulfuric acid. The solution is cooled and 10 ml. of 1:5 acid is added below 15° C. The mixture is cooled further and 2.5 g. 2,4-bis(methylsulfonyl)aniline is added followed by 10 ml. of 1:5 acid, all below 5° C. After stirring for 2 hrs. at 0–5° C., the diazonium solution is added to a chilled solution (below 5° C.) of 3.26 g. 1-(2-acetoxyethyl) - 2 - methyl - 7 - methylsulfonamido-1,2,3,4-tetrahydroquinoline in 100 ml. of 15% sulfuric acid below 5° C. The reaction is kept cold and ammonium acetate is added until the coupling mixture is neutral to Congo red test paper. After allowing to couple for 1 hr. at about 5° C., the reaction mixture is drowned in water. The product is collected by filtration, washed with water, and dried in air. The product, 6[2,4-bis(methylsulfonyl)phenylazo]-1-acetoxyethyl) - 2 - methyl - 7 - methylsulfonamido-1,2,3,4-tetrahydroquinoline, produces fast red dyeings on polyester fibers.

The compounds described in the examples appearing in the table are prepared according to the procedures described in the preceding examples and conform to Formula I. The color given for each compound is the shade produced on polyester fibers by the compound.

| Ex. No. | Substituents on phenyl radical D | A | R, $R^1$, $R^2$, $R^3$, $R^4$ | $R^5$ | Color |
|---|---|---|---|---|---|
| 8 | 2-CN-4,6-di-$NO_2$ | $CH_3CO-$ | 2,2,4-tri-$CH_3$ | $-CH_3$ | Greenish-blue. |
| 9 | Same as above | $C_2H_5OOC-$ | Same as above | $-C_2H_5$ | Do. |
| 10 | do | $C_2H_5NHCO-$ | do | $-C_2H_5$ | Do. |
| 11 | do | $ClCH_2CO-$ | do | $-C_2H_5$ | Do. |
| 12 | do | $CH_3OCH_2CO-$ | do | $-C_2H_5$ | Do. |
| 13 | do | $C_6H_5CH_2OCH_2CO-$ | do | $-C_2H_5$ | Do. |
| 14 | do | $CH_3CH_2CO-$ | do | $-CH_2CH_2CH_3$ | Do. |
| 15 | do | $(CH_3)_2CHCO-$ | do | $-(CH_2)_3CH_3$ | Do. |
| 16 | do | $CH_3CO-$ | do | $-CH_2CH(CH_3)_2$ | Do. |
| 17 | do | Same as above | do | $-C_6H_{11}$ | Do. |
| 18 | do | do | do | $-C_6H_{10}$-p-$CH_3$ | Do. |
| 19 | do | do | do | $-CH_2C_6H_{11}$ | Do. |
| 20 | do | do | None | $-CH_2C_6H_{10}$-p-$CH_3$ | Do. |
| 21 | do | do | do | 3,3,5-tri-$CH_3$-cyclohexyl | Do. |
| 22 | do | do | do | $-C_5H_9$ | Do. |
| 23 | do | $C_6H_5CO-$ | 2,5-di-$CH_3$ | $-CH_2CH_3$ | Do. |
| 24 | do | p-$CH_3O-C_6H_4CO-$ | 2,4,8-tri-$CH_3$ | $-CH_2CH_2CH_3$ | Do. |
| 25 | do | Same as above | 2-$CH(CH_3)_2$ | $-CH_2CH_3$ | Do. |
| 26 | do | $CH_3CO-$ | 2-$CH_3$ | $-CH_2CH(CH_3)_2$ | Do. |
| 27 | do | Same as above | 4-$CH_3$ | $-CH_2CH_3$ | Do. |
| 28 | do | $CH_3SO_2-$ | 2,4-di-$CH_3$ | Same as above | Do. |
| 29 | do | $CH_3CO-$ | 2-$CH_3$-4-$CH_2CH_3$ | do | Do. |
| 30 | do | Same as above | 2-$CH_2CH_3$ | do | Do. |
| 31 | do | $C_6H_5NHCO-$ | 2,2,4-tri-$CH_3$-8-$OCH_3$ | do | Do. |
| 32 | do | $C_6H_{11}CO-$ | 2,2,4-tri-$CH_3$-5-$OCH_3$ | do | Do. |
| 33 | do | $C_6H_{11}NHCO-$ | 2,2,4-tri-$CH_3$ | do | Do. |
| 34 | do | $C_6H_{11}OOC-$ | Same as above | do | Do. |
| 35 | do | $CH_3CO-$ | 3-$OOCCH_3$ | do | Do. |
| 36 | do | Same as above | 3-$OCH_3$ | do | Do. |
| 37 | do | do | 3,8-di-$OCH_3$ | do | Do. |
| 38 | 2-Cl-4,6-di-$NO_2$ | do | 2-$CH(CH_3)_2$ | do | Blue. |
| 39 | Same as above | do | Same as above | $-CH_2CH(CH_3)_2$ | Do. |
| 40 | do | p-$CH_3O-C_6H_4CO-$ | do | $-CH_2CH_3$ | Do. |
| 41 | do | $CH_3CO-$ | do | $-C_6H_{11}$ | Do. |
| 42 | 2-Br-4,6-di-$NO_2$ | $CH_3OCH_2CH_2CO-$ | 2,2,4-tri-$CH_3$ | $-CH_2CH_3$ | Do. |
| 43 | Same as above | $CH_3CO-$ | Same as above | $-CH_2C_6H_5$ | Do. |
| 44 | do | $C_2H_5NHCO-$ | do | Same as above | Do. |
| 45 | do | Same as above | do | $-CH_2CH_2C_6H_5$ | Do. |
| 46 | do | $CH_3CO-$ | do | $-CH_2C_6H_4$-P-$COOCH_3$ | Do. |
| 47 | do | Same as above | do | $-CH_2C_6H_5$-p-$OCH_3$ | Do. |
| 48 | 2-Cl-6-CN-4-$NO_2$ | do | do | $-CH_2CH_3$ | Do. |
| 49 | 2,6-di-CN-4-$NO_2$ | do | do | Same as above | Do. |
| 50 | Same as above | $C_6H_5CO-$ | do | do | Do. |
| 51 | 2-$SO_2CH_2$-4,6-di-$NO_2$ | $CH_3CO-$ | do | do | So. |
| 52 | 2-$C_6H_5CO$-4,6-di-$NO_2$ | Same as above | do | do | Do. |
| 53 | 2-$CH_3CO$-4,6-di-$NO_2$ | do | do | do | Do. |
| 54 | 2-$CF_3$-4,6-di-$NO_2$ | do | do | do | Do. |
| 55 | 2-$SO_2CH_3$-6-CN-4-$NO_2$ | do | do | do | Do. |
| 56 | Same as above | $C_6H_5CO-$ | do | do | Do. |
| 57 | do | Same as above | None | do | Do. |
| 58 | do | p-$CH_3-C_6H_4CO-$ | 2-$CH_3$ | do | Do. |
| 59 | do | p-$CH_3O-C_6H_4CO-$ | 2-$CH_3$ | do | Do. |
| 60 | 2-CN-4,6-di-$NO_2$ | $CH_3CO-$ | 2,2,4-tri-$CH_3$ | $-CH_2CH_2NHCOCH_3$ | Greenish-blue. |
| 61 | Same as above | Same as above | Same as above | $-CH_2CH_2NHCOC_2H_5$ | Do. |
| 62 | do | do | do | $-CH_2CH_2CH_2NHCOCC_2H_5$ | Do. |
| 63 | do | do | do | $-CH_2CH_2CH_2NHSO_2CH_3$ | Do. |
| 64 | do | $C_2H_5OOC-$ | do | $-CH_2CH_2CH_2NHCOCH_3$ | Do. |
| 65 | do | $C_6H_5CO-$ | do | $-CH_2CH_2NHCOC_6H_5$ | Do. |
| 66 | do | $CH_3CO-$ | None | $-CH_2CH_2NHSO_2C_6H_5$ | Do. |
| 67 | do | $ClCH_2CO-$ | do | $-CH_2CH_2OOCCH_3$ | Do. |
| 68 | do | $CH_3OCH_2CO-$ | do | $-CH_2CH_2CN$ | Do. |
| 69 | do | p-$CH_3O-C_6H_4CO-$ | do | $-CH_2CH_2SO_2C_2H_5$ | Do. |
| 70 | 2-Br-4,6-di-$NO_2$ | $C_2H_5OOC-$ | 2,2,4-tri-$CH_3$ | $-CH_2CH_2N\overline{-SO_2\text{-o-}C_6H_4-CO}$ | Blue. |
| 71 | 2-Cl-4,6-di-$NO_2$ | Same as above | Same as above | Same as above | Do. |
| 72 | 2,6-di-CN-4-$NO_2$ | $C_6H_5CO-$ | do | do | Do. |
| 73 | 2-CN-4,6-di-$NO_2$ | $CH_3CO-$ | do | $-CH_2CH_2CH_2N\overline{-CH_2\text{-o-}C_6H_4-CO}$ | Greenish-blue. |
| 74 | Same as above | Same as above | do | $-CH_2CH_2CH_2N\overline{-CO-CH_2OCH_2-CO}$ | Do. |
| 75 | do | do | do | $-CH_2CH_2N(CH_3)SO_2CH_3$ | Do. |
| 76 | do | do | do | $-CH_2CH_2CONH_2$ | Do. |
| 77 | do | $CH_3CO-$ | do | $-CH_2CH_2OOCC_2H_5$ | Do. |
| 78 | do | do | do | $-CH_2CH_2OOCOC_2H_5$ | Do. |
| 79 | do | Same as above | do | $-CH_2CH_2CH_2N\overline{-CO-CH_2CH_2-CO}$ | Do. |
| 80 | 2-Cl-4,6-di-$NO_2$ | do | do | $-CH_2CH_2CH_2NHCOCH_3$ | Blue. |
| 81 | 2-Br-4,6-di-$NO_2$ | do | do | $-CH_2CH_2CH_2NHCOOC_2H_5$ | Do. |
| 82 | 2,6-di-CN-4-$NO_2$ | do | do | $-CH_2CH_2CH_2S-C\overline{=N-N(C_2H_5)-CH=N}$ | Do. |
| 83 | 2-Cl-6-CN-4-$NO_2$ | do | 2-$CH_3$ | $-CH_2CH_2CH_2NHSO_2CH_3$ | Do. |
| 84 | 2-CN-6-$SO_2CH_3$-4-$NO_2$ | do | 2-$CH(CH_3)_2$ | $-CH_2CH_2CH_2Cl$ | Do. |
| 85 | 2-$SO_2CH_3$-4,6-di-$NO_2$ | do | Same as above | $-PCH_2CH_2CH_2Br$ | Do. |

| Ex. No. | Substituents on phenyl radical D | A | R, R¹, R², R³, R⁴ | R⁵ | Color |
|---|---|---|---|---|---|
| 86 | 2-CF₃-4,6-di-NO₂ | do | do | —CH₂CH₂CH₂NCOCH₂CH₂CO— (ring) | Do. |
| 87 | 2-C₆H₅—CO-4,6-di-NO₂ | do | do | Same as above | Do. |
| 88 | 2-CN-6-SO₂CH₃-4-NO₂ | do | do | —CH₂CH₂CH₂N(C₆H₁₁)SO₂CH₃ | Do. |
| 89 | Same as above | do | do | —(CH₂)₄—OCH₃ | Do. |
| 90 | 2-Cl-4,6-di-NO₂ | do | 2-CH₃ | —CH₂CH₂NCOCH₂CH₂CO— (ring) | Do. |
| 91 | 2,4,6-tri-CN | do | 2-CH₃ | —C₂H₅ | Violet. |
| 92 | Same as above | CH₃SO₂— | 2-CH₃ | —CH₂CH(CH₃)₂ | Do. |
| 93 | do | C₆H₅CO— | 2,2,4-tri-CH₃ | —CH₂C₆H₅ | Do. |
| 94 | do | C₂H₅OOC— | Same as above | —C₆H₁₁ | Do. |
| 95 | do | C₂H₅NHCO— | 2-CH(CH₃)₂ | —(CH₂)₅CH₃ | Do. |
| 96 | do | CH₃CO— | 2,2,4-tri-CH₃ | —CH₂CH₂CH₂NHCOC₆H₅ | Do. |
| 97 | do | C₂H₅NHCO— | 2,2,4,5-tetra-CH₃ | —CH₂CH₂CH₂NHCOCH₃ | Do. |
| 98 | do | Same as above | 2,2,4-tri-CH₃ | —CH₂CH₂CH₂NHSO₂C₆H₅ | Do. |
| 99 | do | C₆H₅NHCO— | Same as above | —CH₂CH₂CH₂NHCOCH₂Cl | Do. |
| 100 | do | CH₃CO— | do | —CH₂CH₂CH₂NHCOCH₂OCH₃ | Do. |
| 101 | do | Same as above | do | —CH₂CH₂OCH₃ | Do. |
| 102 | 2,4-di-CN | do | do | —CH₂CH₃ | Red. |
| 103 | Same as above | (CH₃)₂CHCH₂CO— | 2-CH(CH₃)₂ | —CH₂CH₂OC₆H₅ | Red. |
| 104 | do | CH₃SO₂— | Same as above | —CH₂CH₂OC₆H₁₁ | Red. |
| 105 | do | C₆H₅CO— | 2-CH₃ | —CH₂CH₂OCH₂OC₆H₁₁ | Red. |
| 106 | 4-CN | CH₃CO— | 2,2,4-tri-CH₃ | —CH₂CH₃ | Red. |
| 107 | 4-CN | Same as above | Same as above | —CH₂CH₂COOC₆H₅ | Red. |
| 108 | 4-CN | do | do | —CH₂CH₂OSO₂C₆H₅ | Red. |
| 109 | 2-Cl-4-CN | C₆H₅CO— | do | —CH₂CH₂C₆H₅ | Red. |
| 110 | 2-Br-4-CN | CH₃CO— | None | —CH₂CH₂N(COCH₃)₂ | Red. |
| 111 | 2-Br-4,6-CN | Same as above | do | —CH₂CH₂CH₂N(COCH₃)SO₂CH₃ | Violet. |
| 112 | Same as above | C₂H₅OOC— | do | —CH₂CH₂CH₂N(COCH₃)COOC₂H₅ | Do. |
| 113 | 2-Cl-4,6-CN | CH₃CO— | 2,2,4-tri-CH₃ | —CH₂CH₂CH₂NCOCH₂CH₂CO— (ring) | Do. |
| 114 | 2,6-di-Cl-4-CN | C₂H₄CO— | Same as above | Same as above | Red. |
| 115 | Same as above | (CH₃)₂CHCO— | do | —CH₂CH₂CH₂NCOCH₂(OH)CH₂CO— (ring) | Red. |
| 116 | 2,6-di-Br-4-CN | CH₃CO— | 2-CH₃ | —CH₂CH₂NCOCH₂SCO— (ring) | Red. |
| 117 | 4-SO₂CH₃ | Same as above | 2-CH₃ | —CH₃ | Red. |
| 118 | Same as above | CH₃CH₂CO— | 2,2,4-tri-CH₃ | —CH₂CH(CH₃)₂ | Red. |
| 119 | 4-SO₂CH₂CH₂CH₂CH₃ | C₂H₅OOC— | Same as above | —CH₂C₆H₄-p-COOCH₃ | Red. |
| 120 | 4-SO₂CH₂CH₃ | (CH₃)₂CHCO— | do | —CH₂CH₂NCOCH₂OCO— (ring) | Red. |
| 121 | 4-SO₂CH₃ | CH₃-p-C₆H₄CO— | 2-CH(CH₃) | —CH₂CH₂NCOCH₂NHCO— (ring) | Red. |
| 122 | 2-CN-4-SO₂CH₃ | CH₃-p-C₆H₄SO₂— | 2-CH₃ | —CH₂CH₂NCO-o-C₆H₄-CO— (ring) | Red. |
| 123 | Same as above | CH₃CO— | 2,2,4-tri-CH₃ | —CH₂CH₂N(CH₃)SO₂CH₃ | Red. |
| 124 | 2-Cl-4-SO₂CH₃ | Same as above | Same as above | —C₂H₅ | Red. |
| 125 | Same as above | C₆H₅CO— | 2-CH₃ | —C₂H₅ | Red. |
| 126 | 2-Br-4-SO₂CH₃ | Same as above | 2-CH₃ | —CH₂CH₂N(C₆H₅)SO₂CH₃ | Red. |
| 127 | 2-Br-4-SO₂CH₂CH₃ | CH₃CO— | 2,2,4-tri-CH₃ | —CH₂CH₂N(CH₃)COCH₃ | Red. |
| 128 | 2,4-di-SO₂CH₃ | Same as above | Same as above | —CH₂CH(CH₃)₂ | Red. |
| 129 | Same as above | CH₃SO₂— | 2-CH₃ | —CH₂CH₂N(CH₃)COCH₃ | Red. |
| 130 | do | C₂H₅NHCO— | 2-CH₃ | —CH₂CH₂N(C₂H₅)SO₂CH₃ | Red. |
| 131 | do | C₂H₅OOC— | 2-CH(CH₃)₂ | —CH₂CH₂N(CH₂CH₂CN)SO₂CH₃ | Red. |
| 132 | do | CH₃CO— | 2,2,4-tri-CH₃ | —CH₂CH₂N(C₆H₄-p-CH₃)SO₂CH₃ | Red. |
| 133 | 2,6-di-CN-4-SO₂CH₃ | Same as above | Same as above | —CH₂CH₂N(SO₂C₆H₅)₂ | Violet. |
| 134 | 2,4-di-SO₂CH₃-6-CN | do | do | —CH₂CH₂N(CH₂CH₂OH)SO₂C₂H₅ | Blue. |
| 135 | 2,6-di-Cl-4-SO₂CH₃ | do | do | —CH₂CH₂N(SO₂CH₃)₂ | Red. |
| 136 | 2,4-di-SO₂CH₃-6-Br | do | do | —CH₂CH₂N(CH₂CH₂CN)COC₆H₅ | Violet. |
| 137 | 2-CN-6-Cl-4-SO₂CH₂CH₃ | do | do | —CH₂CH₂OCH₂CH₂CN | Do. |
| 138 | 2,4-di-SO₂CH₃ | do | do | —CH₂CH₂SCH₃ | Red. |
| 139 | 2-CN-4,6-di-NO₂ | do | do | —CH₂CH₂SC₆H₅ | Greenish-blue. |
| 140 | Same as above | do | do | —CH₂CH₂SCH₂CH₂CN | Do. |
| 141 | do | do | do | —CH₂CH₂SC=N—NH—CH=N— (ring) | Do. |
| 142 | do | do | do | —CH₂CH₂SC=N-o-C₆H₄—O— (ring) | Do. |
| 143 | do | do | do | —CH₂CH₂SC=N-o-C₆H₄—S— (ring) | Do. |
| 144 | do | do | do | —CH₂CH₂OOCCH₃ | Do. |
| 145 | do | C₆H₅CO— | do | —CH₂CH₂SO₂CH₃ | Do. |
| 146 | do | CH₃CO— | do | —CH₂CH₂SO₂CH₃ | Do. |
| 147 | do | (CH₃)₂CHCO— | 2-CH₃-5-OCH₃ | Same as above | Do. |
| 148 | do | CH₃CO— | Same as above | do | Do. |
| 149 | do | CH₃SO₂— | 2,2,4,8-tetra-CH₃ | do | Do. |
| 150 | do | C₆H₅SO₂— | 2-CH(CH₃)₂ | do | Do. |
| 151 | do | p-Cl-C₆H₄SO₂— | Same as above | do | Do. |
| 152 | do | CH₃CO— | do | —CH₂CH₂CONH₂ | Do. |
| 153 | do | CH₃SO₂— | 2,2,4-tri-CH₃ | Same as above | Do. |
| 154 | do | CH₃CO— | Same as above | —CH₂CH₂CONHC₆H₅ | Do. |
| 155 | do | Same as above | do | —CH₂CH₂OOCNHC₂H₅ | Do. |
| 156 | do | do | do | —CH₂CH₂OOCNHC₆H₅ | Do. |
| 157 | do | do | do | —CH₂CH₂SC=N—N=C(NHCOCH₃)—S— (ring) | Do. |

| Ex. No. | Substituents on phenyl radical D | A | R, R¹, R², R³, R⁴ | R⁵ | Color |
|---|---|---|---|---|---|
| 158 | do | do | do | —CH₂CH₂SC=N—N=C(CH₃)—O— | Do. |
| 159 | do | do | do | —CH₂CH₂SC=N—CHCH—S— | Do. |
| 160 | do | do | do | —CH₂CH₂OOCCH₃ | Blue. |
| 161 | 2-Br-4,6-di-NO₂ | C₆H₅CO— | 2-CH₃ | same as above | Do. |
| 162 | Same as above | CH₃SO₂— | 2-CH₃ | —CH₂CH₂CONH₂ | Do. |
| 163 | 2-Cl-4,6-di-NO₂ | same as above | 2-CH(CH₃)₂ | same as aboce | Do. |
| 164 | same as above | CH₃CO— | same as above | —CH₂CH(OOCCH₃)CH₂OOCCH₃ | Do. |
| 165 | do | same as above | 2,2,4-tri-CH₃ | —CH₂C₆H₅COOC₂H₅ | Do. |
| 166 | 2-CN-4,6-di-NO₂ | do | 2-CH(CH₃)₂ | —CH₂CH(Cl)CH₂Cl | Greenish-blue. |
| 167 | same as above | do | same as above | —CH₂CH(OOCCH₃)CH₂CL | Do. |
| 168 | do | do | do | —CH₂(OOCCH₃)CH₂OCH₃ | Do. |
| 169 | do | do | do | —CH₂CH(OOCCH₃)CH₂OC₆H₅ | Do. |
| 170 | do | C₆H₁₁CO— | do | —CH₂CH₂OC₆H₁₁ | Do. |
| 171 | do | C₆H₅CO— | 2,4-di-CH₃ | —CH₂CH₂OCH₃ | Do. |
| 172 | do | p-CH₃—C₆H₄CO— | 2-CH₃ | —CH₂CH₂OC₂H₅ | Do. |
| 173 | do | p-CH₃O—C₆H₄CO— | 2-CH₃ | —CH₂CH₂OCH₂CH(CH₃)₂ | Do. |
| 174 | do | p-Cl—C₆H₄CO— | 2-CH₃ | —CH₂CH₂NHCOCH₃ | Do. |
| 175 | do | F₃CCO— | 2-CH₃ | same as above | Do. |
| 176 | do | NCCH₂CO— | 2-CH₃ | do | Do. |
| 177 | do | H₂NSO₂— | 2-CH₃ | do | Do. |
| 178 | do | (CH₃)₂NSO₂— | 2-CH₃ | do | Do. |
| 179 | do | CH₃S—CH₂CO— | 2-CH₃ | do | Do. |
| 180 | do | CH₃SO₂CH₂CO— | 2-CH₃ | —CH₂CH₂NHCOCH₂CH(CH₃)₂ | Do. |
| 181 | do | CH₃CO— | 2-CH₃ | —CH₂CH₂CH₂NHSO₂CH₃ | Do. |
| 182 | do | same as above | 2-CH₃ | —CH₂CH₂CH₂NHCOC₆H₁₁ | Do. |
| 183 | do | do | 2-CH₃ | —CH₂CH₂CN | Do. |
| 184 | do | do | 2-CH₃ | —CH₂CH₂COOCH₃ | Do. |
| 185 | do | do | 2-CH₃ | —CH₂CH₂SCN | Do. |
| 186 | do | do | 2-CH₃ | —CH₂CH₂NHSO₂N(CH₃)₂ | Do. |
| 187 | do | do | 2-CH₃ | —CH₂CH₂SO₂C₆H₅ | Do. |
| 188 | do | C₆H₁₁OOC— | 2-CH₃ | —CH₂CH₂N(CH₂CH₂CN)SO₂CH₃ | Do. |
| 189 | do | do | 2-CH₃ | —CH₂CH₂NHCOCH₃ | Do. |
| 190 | do | do | 2-CH₃ | —CH₂CH₂F | Do. |

The compounds of the invention can be applied to linear polyester textile materials in accordance with known disperse dyeing procedures using auxiliary dyeing agents such as surfactants, dispersing agents, carriers, thickeners, etc. The dyeing can be carried out at the boil at atmospheric pressures or at higher temperatures under pressures moderately above atmospheric pressures. The following example illustrates a carrier dyeing procedure for applying the azo compounds of the invention to polyester textile materials.

EXAMPLE 191

The azo compound of Example 1 (0.1 g.) is dissolved in 10 cc. of 2-methoxyethanol. A small amount (3–5 cc.) of a 3% sodium lignin sulfonate aqueous solution is added, with stirring, and then the volume of the bath is brought to 300 cc. with water. 3 cc. of an anionic solvent carrier (Tanavol) is added to the bath and 10 g. of a textile fabric made of poly(ethylene terephthalate) fibers is placed in the bath and worked 10 minutes without heat. The dyeing is carried out at the boil for one hour. The dyed fabric is removed from the dyebath and scoured for 20 minutes at 80° C. in a solution containing 1 g./l. neutral soap and 1 g./l. sodium carbonate. The fabric is then rinsed, dried in an oven at 250° F. and heat set (for removal of residual carrier) for 5 minutes at 350° C.

The compounds of the invention can also be applied to polyester textile materials by the heat fixation technique described in U.S. Pat. 2,663,612 and in the American Dyestuff Reporter, 42, 1 (1953). The following procedure describes how the azo compounds of the invention can be applied to polyester materials by the heat fixation technique.

EXAMPLE 192

A mixture of:

500 mg. of the compound of Example 3, 150 mg. of a sodium lignosulfonate dispersing agent (Marasperse N), 150 mg. of a partially desulfonated sodium lignosulfonated (Marasperse CB), 0.5 ml. glycerin, and 1.0 ml. of water is ground in a microsize container (an accessory for a 1-quart size Szegvari Attritor) for approximately 3.5 hours. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65° C. with continuous stirring.

A thickener and penetrating mixture is prepared by mixing:

1 ml. of a complex diaryl sulfonate surfactant (Compound 8-S),
3 ml. of a 3% solution of a sodium N-methyl-N-oleoyltaurate (Igepon T–S1),
8 ml. of a 25% solution of natural gums (Superclear 80N), and sufficient water to bring the volume to 100 ml. The thickener and penetrating mixture is added to the dye paste, the volume is adjusted to 200 ml. and the mixture is agitated for 15 minutes. The dye mixture is then filtered through folded cheesecloth to remove the stainless steel balls and it then is added to the reservoir of a Butterworth padder where it is heated to about 45–60° C.

10 g. of a fabric of poly(ethylene terephthalate) fibers and 10 g. of a fabric of 65/35 spun poly(ethylene terephthalate)/cotton fibers are sewn together, end-to-end, and padded for 5 minutes of continuous cycling through the dye mixture and between three rubber squeeze rollers of the padder. Dye mixture pickup is about 60% based on the weight of the fabrics.

The padded fabrics are then dried at 200° F. and then heat-fixed for 2 minutes at 415° F. in a forced air oven. The dyed fabrics are scoured for 20 minutes 65–70° C. in a solution containing 0.2% sodium hydrosulfite, 0.2% sodium carbonate and 1.7% of a 3% solution of sodium N-methyl-N-oleoyltaurate and then dried. The dyed fabrics possess excellent brightness and fastness to light and sublimation when tested according to the procedures described in the 1966 edition of the Technical Manual of the American Association of Textile Chemists and Colorists.

The heat fixation dyeing procedure described above can be varied by the substitution of other dispersing agents, surfactants, suspending agents, thickeners, etc. The temperature and time of the heat-fixation step can also be varied.

Polymeric linear polyeser materials of the terephthalate sold under the trademarks "Kodel," "Dacron" and "Terylene" are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimethanol and dimethylterephthalate are more particularly described in U.S. Pat. 2,901,446. Poly(ethylene terephthalate) polyester fibers are described, for example, in U.S. Pat. 2,465,319. The polymeric linear polyester materials disclosed in U.S. Pats. 2,945,010, 2,957,745 and 2,989,363, for example, can be dyed. The linear aromatic polyester materials specifically named have a melting point of at least 200° C. The poly(ethylene terephthalate) fibers which are dyed with the compounds of the invention are manufactured from a melt of a polymer having an inherent viscosity of at least 0.35 and preferably, about 0.6. The inherent viscosity of the poly(1,4-cyclohexylenedimethylene terephthalate) polymer is also at least 0.35. These inherent viscosities are measured at 25° C. using 0.25 g. polymer per 100 ml. of a solvent consisting of 60% phenol and 40% tetrachloroethane. The polyester fabrics, yarns, fibers and filaments that are dyed with the novel azo compounds can also contain minor amounts of other additives such as brighteners, pigments, delusterants, inhibitors, stabilizers, etc. Although the azo compounds of the invention are particularly suitable for dyeing polyester textile materials, they can also be used to dye other hydrophobic textile materials such as cellulose acetate and polyamide fibers.

The invention has been described in considerable detail with particular reference to preferred embodiments thereof, but it will be understood that variations and modifications can be effected within the spirit and scope of the invention.

We claim:

1. A water-insoluble compound having the formula

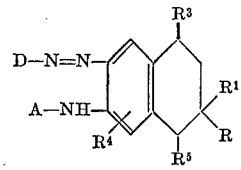

wherein D is a phenyl radical having the structure

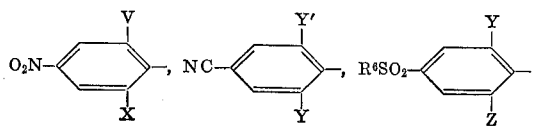

wherein

V is chlorine, bromine, cyano, lower alkanoyl, benzoyl, lower alkylbenzoyl, lower alkoxybenzoyl, chlorobenzoyl, lower alkylsulfonyl, or trifluoromethyl;

X is nitro or cyano;

Y and Y' are the same or different and each is hydrogen, cyano, chlorine, or bromine;

Z is hydrogen, cyano, chlorine, bromine, or lower alkylsulfonyl; and $R_6$ is lower alkyl;

A is formyl; lower alkanoyl; lower alkanoyl substituted with chlorine, bromine, Ar, cyano, lower alkoxy, lower alkylthio, lower alkylsulfonyl, or benzyloxy; ArCO; cyclohexylcarbonyl; lower alkoxycarbonyl; lower alkoxycarbonyl substituted with cyano, hydroxy, chlorine, or bromine; ArOOC—; cyclohexoxycarbonyl; lower alkylsulfonyl; lower alkylsulfonyl substituted with cyano, hydroxy, chlorine, or bromine; cyclohexylsulfonyl; ArSO$_2$—; carbamoyl; lower alkylcarbamoyl; ArNHCO—; sulfamoyl; lower alkylsulfamoyl; or ArNHSO$_2$—; wherein Ar is phenyl or phenyl substituted with lower alkyl, lower alkoxy, chlorine, or bromine;

R is methyl or, when $R^1$ and $R^3$ each is hydrogen, R is lower alkyl;

$R^1$ and $R^3$ each is hydrogen or methyl;

$R^4$ is hydrogen, lower alkyl or lower alkoxy; and $R^5$ is lower alkyl, benzyl, 2-phenylethyl, cyclohexyl, or a substituted alkyl group having the formula —$R^8$—$R^9$ wherein $R^8$ is ethylene or propylene and $R^9$ is lower alkanoyloxy, lower alkoxy, lower alkanoylamino, cyano, carbamoyl, lower alkylsulfonyl, lower alkoxycarbonyloxy, succinimido, glutarimido, or phthalimido.

2. A compound according to claim 1 having the formula

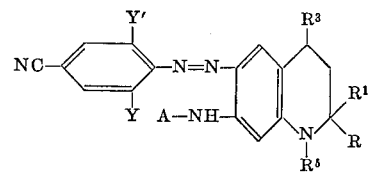

wherein

Y and Y' each is hydrogen, cyano, chlorine or bromine;
A is lower alkanoyl, benzoyl, or lower alkoxycarbonyl.

3. A compound according to claim 1 having the formula

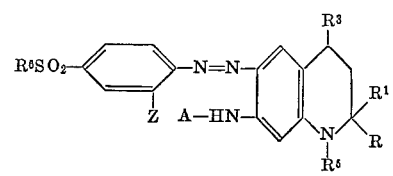

wherein

Z is hydrogen, chlorine, bromine or lower alkylsulfonyl;
$R^6$ is lower alkyl;
A is lower alkanoyl, benzoyl, or lower alkoxycarbonyl.

4. A compound according to claim 1 having the formula

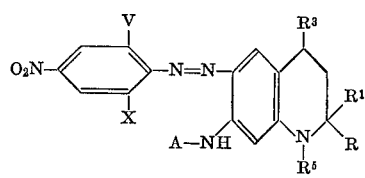

wherein

V is chlorine, bromine, cyano, or benzoyl;
X is nitro or cyano;
A is lower alkanoyl, benzoyl, or lower alkoxycarbonyl.

5. A compound according to claim 4 wherein
V is chlorine, bromine, or cyano;
X is nitro; and
$R^5$ is lower alkyl, benzyl, or a group having the formula —$R^8$—$R^9$ wherein $R^8$ is ethylene or propylene, and $R^9$ is lower alkoxy, lower alkanoyloxy, cyano, carbamoyl, lower alkanoylamino, or lower alkylsulfonyl.

6. A compound according to claim 1 having the formula

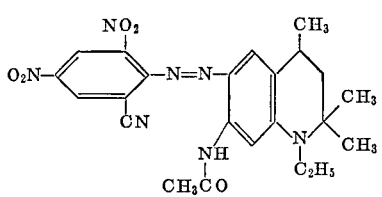

7. A compound according to claim 1 having the formula

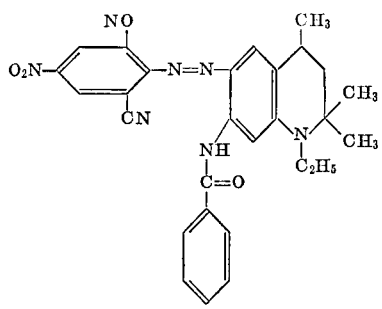

8. A compound according to claim 1 having the formula

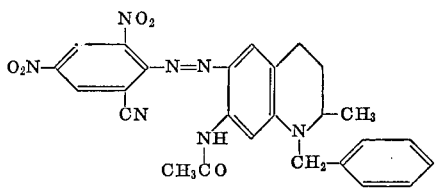

9. A compound according to claim 1 having the formula

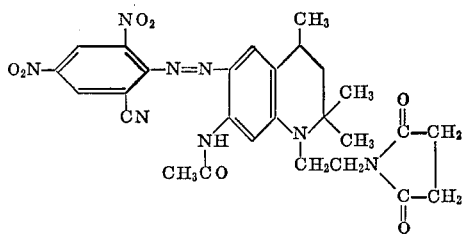

10. A compound according to claim 1 having the formula

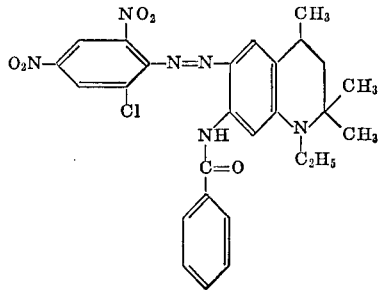

References Cited
UNITED STATES PATENTS 2,249,774    7/1941    McNally et al. _____ 260—155
3,213,081   10/1965    Straley et al. _____ 260—155

ALEX MAZEL, Primary Examiner
D. M. PAPUGA, Assistant Examiner

U.S. Cl. X.R.

8—41, 179; 260—283 R, 287 R, 288 R, 289 R

PO-1050
(5/69)

UNITED STATES PATENT OFFICE
CERTIFICATE OF CORRECTION

Patent No. 3,635,941            Dated January 18, 1972

Inventor(s) Max A. Weaver, James M. Straley and Clarence A. Coates, Jr.

It is certified that error appears in the above-identified patent and that said Letters Patent are hereby corrected as shown below:

Column 3, line 46, delete "piperidiono" and insert ---piperidono---.

Column 4, line 28, delete "alkanoloxy" and insert ---alkanoyloxy---.

Column 4, lines 35-41, formula should read

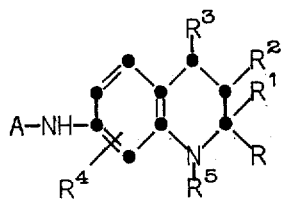

Column 5, line 70, delete "slurred" and insert ---slurried---.

Example 51, under "Substituents on Phenyl radical D" delete "2-$SO_2CH_2$-4,6-di-$NO_2$" and insert ---2-$SO_2CH_3$-4,6-di-$NO_2$---.

Example 62 under "$R^5$" delete "-$CH_2CH_2CH_2NHCOCC_2H_5$" and insert --- -$CH_2CH_2CH_2NHCOOC_2H_5$---.

Example 85, under "$R^5$" delete "-$PCH_2CH_2CH_2Br$" and insert --- -$CH_2CH_2CH_2Br$---.

Example 114 under "A", delete "$C_2H_4CO$-" and insert ---$C_2H_5CO$- ---.

Example 126, under "$R^5$" delete "-$CH_2CH_3N(C_6H_5)SO_2CH_3$" and insert --- -$CH_2CH_2N(C_6H_5)SO_2CH_3$---.

Example 167, under "$R^5$" delete "-$CH_2CH(OOCCH_3)CH_2CL$--- and insert --- -$CH_2CH(OOCCH_3)CH_2Cl$---.

Example 168 under "$R^5$" delete "-$CH_2(OOCCH_3)CH_2OCH_3$" and insert --- -$CH_2CH(OOCCH_3)CH_2OCH_3$---.

PO-1050
(5/69)

UNITED STATES PATENT OFFICE
CERTIFICATE OF CORRECTION

Patent No. 3,635,941          Dated January 18, 1972

Inventor(s) Max A. Weaver, James M. Straley and Clarence A. Coates, Jr.

It is certified that error appears in the above-identified patent and that said Letters Patent are hereby corrected as shown below:

- 2 -

Column 13, line 60, claim 1, after "chlorobenzoyl" insert ---bromo-benzoyl---.

Column 15, claim 7, in the formula "NO" should read ---$NO_2$---.

Signed and sealed this 29th day of August 1972.

(SEAL)
Attest:

EDWARD M. FLETCHER, JR.          ROBERT GOTTSCHALK
Attesting Officer          Commissioner of Patents